(12) United States Patent
Lee et al.

(10) Patent No.: US 7,948,273 B2
(45) Date of Patent: May 24, 2011

(54) SOFT-START DEVICE

(75) Inventors: Chao-Cheng Lee, HsinChu (TW); Wei-Chou Wang, TaoYuan (TW)

(73) Assignee: Realtek Semiconductor Corp., Hsinchu (TW)

( * ) Notice: Subject to any disclaimer, the term of this patent is extended or adjusted under 35 U.S.C. 154(b) by 12 days.

(21) Appl. No.: 12/388,201

(22) Filed: Feb. 18, 2009

(65) Prior Publication Data
US 2009/0206920 A1 Aug. 20, 2009

(30) Foreign Application Priority Data

Feb. 19, 2008 (TW) ................................ 97105701 A

(51) Int. Cl.
G05F 1/00 (2006.01)
H03K 5/00 (2006.01)
(52) U.S. Cl. .......................................... 327/77; 323/238
(58) Field of Classification Search .................... 323/238, 323/321; 327/56, 77
See application file for complete search history.

(56) References Cited

U.S. PATENT DOCUMENTS

| 4,223,237 | A | * | 9/1980 | Yamada et al. | 327/180 |
|---|---|---|---|---|---|
| 4,490,653 | A | * | 12/1984 | Olmstead | 315/403 |
| 4,520,276 | A | * | 5/1985 | Baker | 327/137 |
| 5,225,714 | A | * | 7/1993 | Kimoto et al. | 327/133 |
| 5,898,323 | A | * | 4/1999 | Suda | 327/66 |
| 6,348,833 | B1 | | 2/2002 | Tsujimoto et al. | |
| 6,377,480 | B1 | * | 4/2002 | Sase et al. | 363/49 |
| 6,469,914 | B1 | * | 10/2002 | Hwang et al. | 363/21.01 |
| 6,525,517 | B1 | * | 2/2003 | Hojo et al. | 323/316 |
| 6,617,833 | B1 | * | 9/2003 | Xi | 323/282 |
| 7,170,352 | B1 | * | 1/2007 | Caldwell | 330/261 |
| 7,202,738 | B1 | * | 4/2007 | Huijsing et al. | 330/253 |
| 7,208,927 | B1 | * | 4/2007 | Nguyen | 323/282 |
| 7,535,208 | B2 | * | 5/2009 | De Cremoux | 323/280 |
| 7,619,397 | B2 | * | 11/2009 | Al-Shyoukh | 323/281 |
| 7,719,249 | B2 | * | 5/2010 | Matyas et al. | 323/285 |
| 2007/0030709 | A1 | * | 2/2007 | Kitagawa | 363/49 |
| 2008/0246450 | A1 | * | 10/2008 | Matyas et al. | 323/238 |
| 2009/0027028 | A1 | * | 1/2009 | Ting | 323/288 |
| 2009/0027086 | A1 | * | 1/2009 | Trifonov | 327/66 |
| 2009/0295340 | A1 | * | 12/2009 | Kwon et al. | 323/220 |

FOREIGN PATENT DOCUMENTS

WO 2006/085847 A1 * 8/2006
WO WO2006/085847 * 8/2006

OTHER PUBLICATIONS

Textbook Series for 21st Century, Higher Education Press. pp. 8-11. ISBN 7-04-009147-X.

* cited by examiner

*Primary Examiner* — Thomas J. Hiltunen
(74) *Attorney, Agent, or Firm* — Thomas, Kayden, Horstemeyer & Risley, LLP

(57) ABSTRACT

A soft-start device including a current source, a first transistor, and a second transistor is described. The first transistor is coupled to the current source, and an amount of current conducted by the first transistor is determined according to a voltage. The second transistor is also coupled to the current source, and an amount of current conducted by the second transistor is determined according to a fixed bias. An initial voltage value of the voltage is smaller than a voltage value of the fixed bias. However, after a soft start, the voltage value of the first voltage is increased gradually to be larger than the voltage value of the fixed bias, such that the soft start may be implemented smoothly.

18 Claims, 9 Drawing Sheets

SOFT-START DEVICE

CROSS-REFERENCES TO RELATED APPLICATIONS

This non-provisional application claims priority under 35 U.S.C. §119(a) on Patent Application No(s). 97105701 filed in Taiwan, R.O.C. on Feb. 2, 2008, the entire contents of which are hereby incorporated by reference,

BACKGROUND OF THE INVENTION

1. Field of Invention

The present invention relates to a soft-start device, and more particularly to a soft-start device that has a smooth switching process without any surge, and is capable of prolonging a starting time.

2. Related Art

Soft-start devices may be applied in multiple circuits. Circuits in which an input power must rise slowly to avoid damage to the circuits due to an excessive current surge or an excessive voltage at an initial power on stage, may all use soft-start devices.

Taking a switching regulator as an example, the switching regulator has good voltage conversion efficiency and is therefore usually used for converting large voltage differences and large load current. However, at an initial power on stage, the switching regulator easily results in an excessive current surge or an excessive voltage, thereby possibly damaging the circuit. Therefore, a soft-start device needs to be used at the power on stage to make the power supply voltage rise slowly.

FIG. 1A is a schematic view of a soft-start device in the prior art. In the design of the prior art, the soft-start device includes a current source (I) A10, a capacitor (C) A20, a switch A30, a reference voltage ($V_{ref}$) A40, and a fixed voltage source ($V_{bg}$) A50.

At the beginning, the soft-start device performs an open-loop operation, that is, the switch A30 is in an open state. The capacitor A20 is charged by the current source A10. In the charging process, the capacitor A20 slowly increases the voltage to generate a ramp voltage. Therefore, the reference voltage A40 is increased slowly with the ramp voltage at the same time, so as to achieve the soft-start.

When the ramp voltage approaches a voltage value of the fixed voltage source A50 (here the voltage value of the fixed voltage source A50 may be a bandgap voltage), the soft-start mechanism must end in order to restore the whole system to normal operation. The conventional practice is closing the switch A30 to switch back to a closed loop, such that the reference voltage A40 outputs the voltage value of the fixed voltage source A50, that is, it outputs the bandgap voltage.

However, the switching time point of the switch A30 is hard to control, which easily causes discontinuous surges such that the system is unstable, and may also cause faults in operation. FIG. 1B is a schematic view (I) of a switching waveform of the soft-start device in the prior art. As FIG. 1B demonstrates, if the switch A30 is switched too late the reference voltage ($V_{ref}$) exceeds the bandgap voltage ($V_{bg}$), so as to form an upward surge before returning to the bandgap voltage value ($V_{bg}$). Conversely, FIG. 1C is a schematic view (II) of a switching waveform of the soft-start device in the prior art. As FIG. 1C demonstrates, if the switch A30 is switched too early the reference voltage ($V_{ref}$) does not reach the bandgap voltage ($V_{bg}$), so that a gap is generated between the reference voltage A40 and the bandgap voltage.

On the other hand, the soft-start device mainly functions to raise the power supply voltage slowly, so as to avoid damage to the circuit due to the excessive current surge at the initial stage of the power on. The slower the power supply voltage rises, the smaller the voltage rising in a unit time is, and thus the circuit is less likely to be damaged. Therefore, the soft-start device is generally required to have a long soft-start time, such that the power supply voltage may rise gradually. A time required for the soft-start is expressed in the following equation:

$$T_s = \frac{C}{I} \times V_{bg}.$$

As the above equation describes, in order to make the soft-start time ($T_s$) long, the current source (I) must be small and the capacitor (C) must be large. In the conventional practice, a large capacitor is connected externally using an additional pin, so as to achieve increased capacitance. However, in such a practice not only the additional pin and large capacitor are added (resulting in increased cost), but also the externally connected capacitor is difficult to integrate into the IC.

Therefore, the challenge of how to solve the relevant problems of switch switching and soft-start time of the soft-start device in the prior art is an issue pressing for a solution.

SUMMARY OF THE INVENTION

Accordingly, the present invention is directed to a soft-start device. The soft-start device solves the problem of a switching time point being hard to control in the prior art by using a soft switching circuit as a switching mechanism between the open loop and the closed loop mentioned in the Related Art, so that the conversion process is smooth and without any surge. Moreover, as for the prolongation of the soft-start time, an attenuation circuit is utilized to increase a time constant without adding the pin and externally connected large capacitor as in the prior art. The attenuation circuit has a simple and diversified structure, and thus the soft-start time is easy to prolong, so that a power supply voltage at an initial power on stage rises more gradually.

The present invention provides a soft-start device, which includes a current source, a first transistor, and a second transistor. The first transistor is coupled to the current source, and an amount of current conducted by the first transistor is determined according to a first voltage. The second transistor is coupled to the current source, and an amount of current conducted by the second transistor is determined according to a fixed bias. An initial voltage value of the first voltage is smaller than a voltage value of the fixed bias, and the voltage value of the first voltage is increased gradually so that it is larger than the voltage value of the fixed bias when a soft start begins.

The present invention also provides a soft-start device, which includes an attenuation circuit an amplifier, and a soft switching circuit. The attenuation circuit receives a second voltage and enlarges a time constant by reducing a ratio of the second voltage to generate an attenuated second voltage. The amplifier has an input end and an output end. The input end is coupled to the attenuation circuit, and a second capacitor is connected in series between the input end and the output end. The second voltage charges the second capacitor through the attenuation circuit, and the output end outputs a gradually rising first voltage. The soft switching circuit is coupled to the output end of the amplifier, and is adapted to receive the first voltage and output a reference voltage according to the first voltage.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1A:
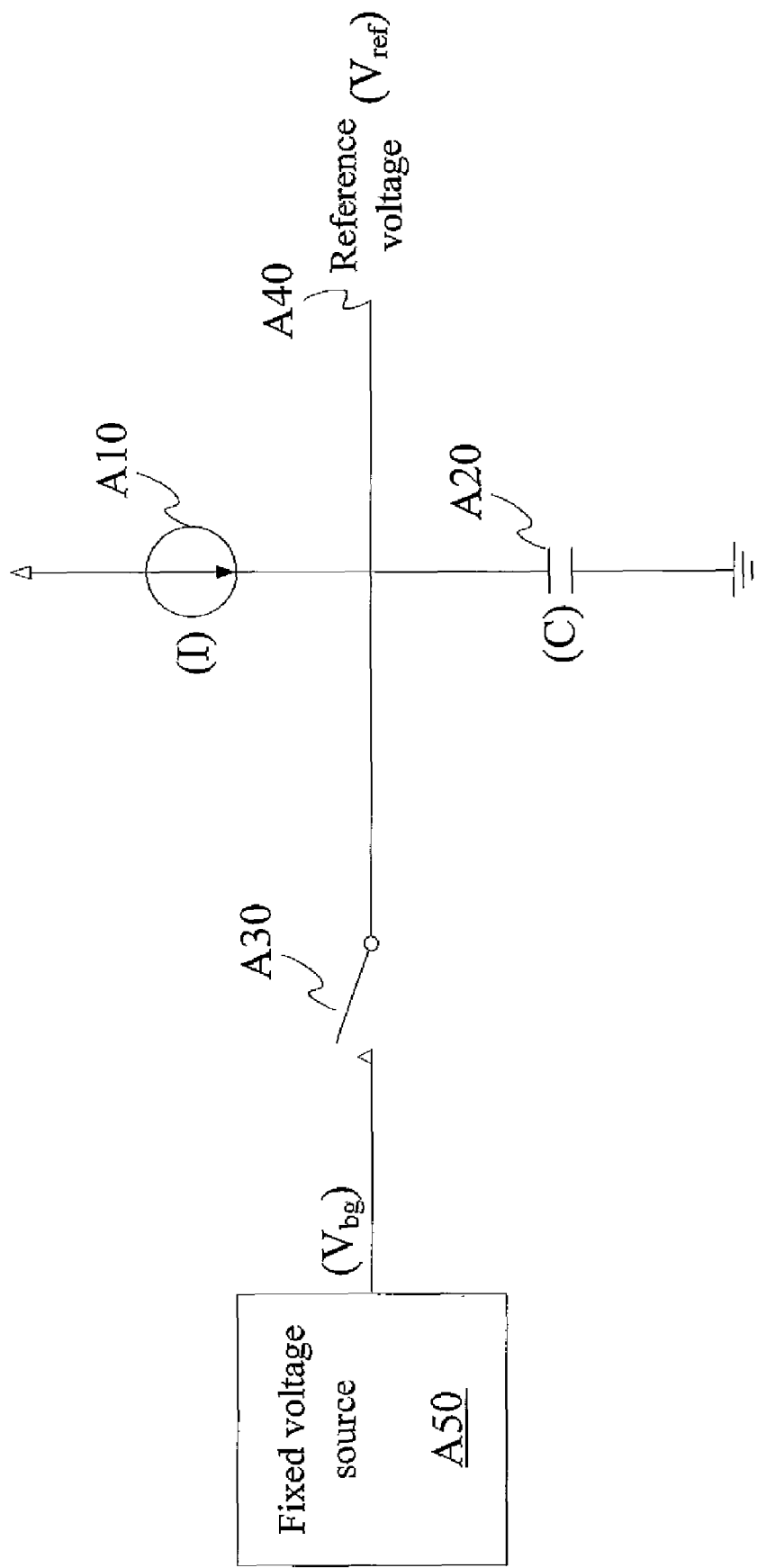
FIG. 1A is a schematic view of a soft-start device in the prior art.
Figure 1B:
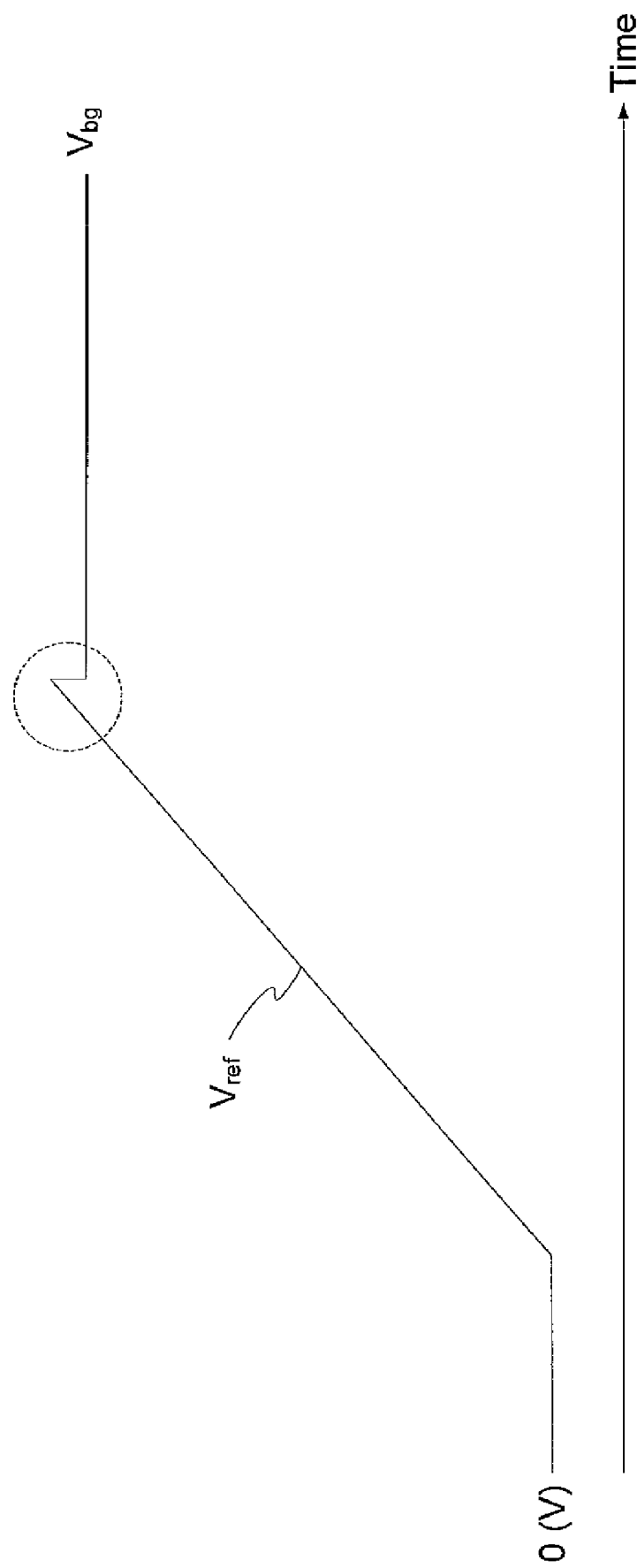
FIG. 1B is a schematic view (I) of a switching waveform of the soft-start device in the prior art.
Figure 1C:
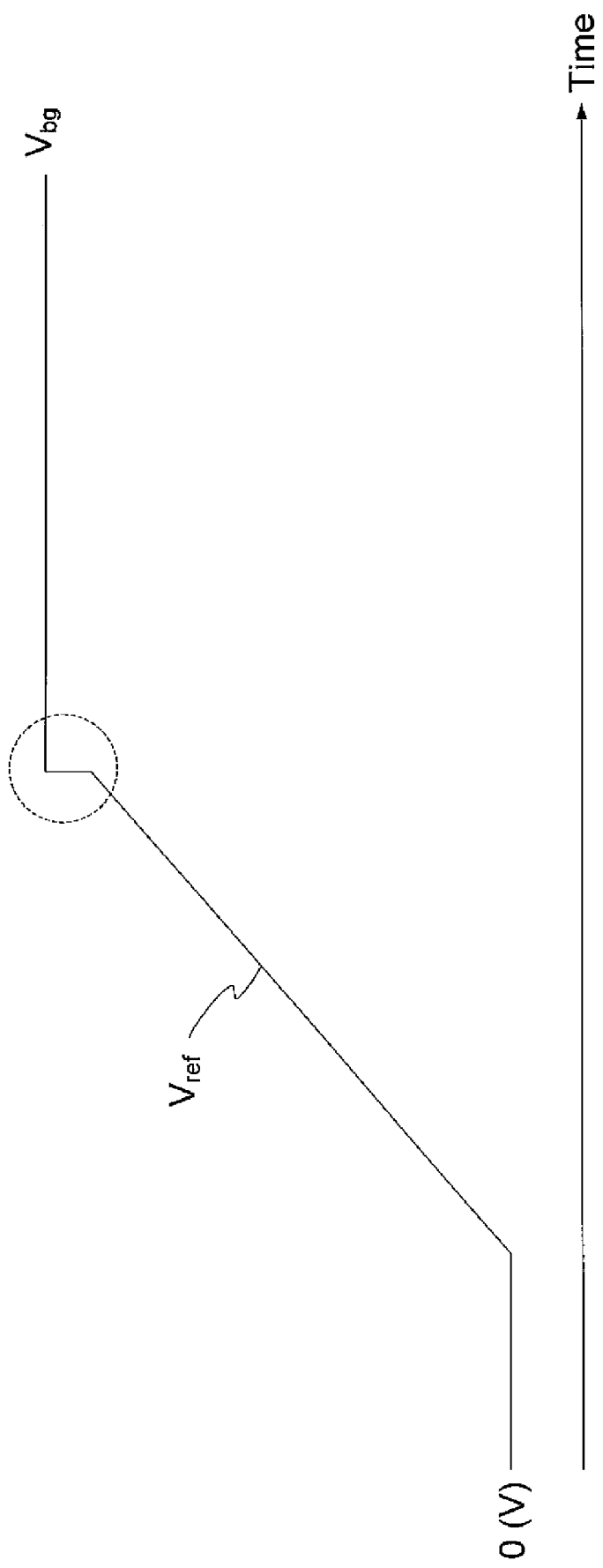
FIG. 1C is a schematic view (II) of a switching waveform of the soft-start device in the prior art.
Figure 2A:
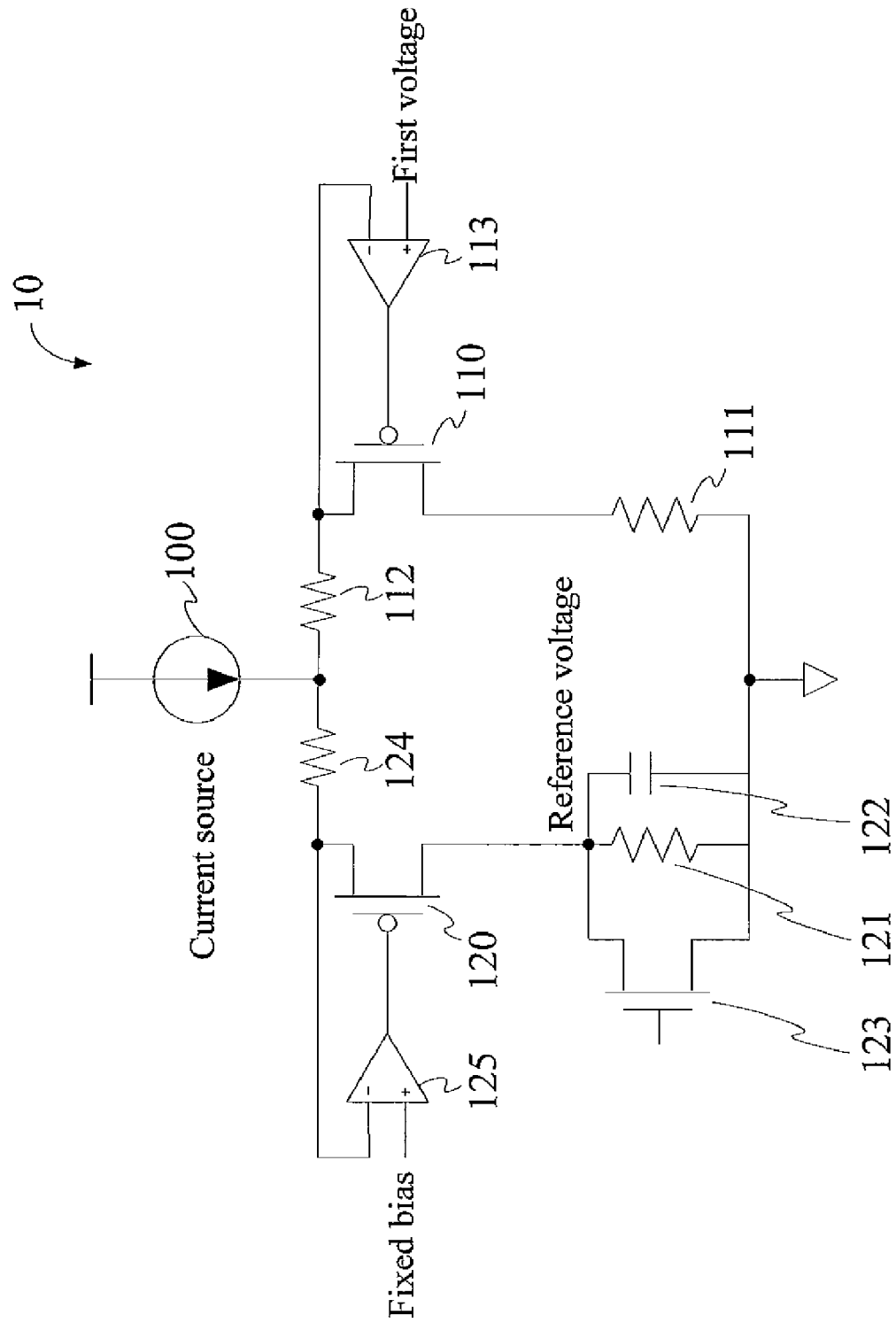
FIG. 2A is a schematic view of a soft-start device according to a first embodiment of the present invention.

FIG. 2A is a schematic view of a soft-start device according to a first embodiment of the present invention. The soft-start device includes a current source 100, a first transistor 110, a second transistor 120, a first resistor 111, a second resistor 121, a third resistor 112, a fourth resistor 124, a first comparator 113, a second comparator 125, a first capacitor 122, and a reset switch 123. The connection relationships between each other are shown in the figure.

The mode of operation of this embodiment is as follows. When a soft start works, a first voltage controlling the first transistor 110 is increased gradually from an initial voltage value (a relative zero voltage value). The initial voltage value is smaller than a voltage value (i.e., a voltage value of a fixed bias), for controlling the second transistor 120, but is increased gradually with the voltage value of the first voltage, and is finally larger than the voltage value of the fixed bias. Since the first transistor 110 and the second transistor 120 are PMOS switches characterized by being turned on by a negative voltage, the first transistor 110 is gradually turned off and the second transistor 120 is gradually turned on as the voltage value of the first voltage rises gradually. An amount of current of the current source 100 is a sum of an amount of current conducted by the first transistor 110 and an amount of current conducted by the second transistor 120. Therefore, at the same time that the first voltage received by the first comparator 113 determines the amount of current conducted by the first transistor 110 (thereby determining a potential difference between both ends of the first resistor 111), the amount of current conducted by the second transistor 120 is also determined, and a potential difference between both ends of the second resistor 121 is changed correspondingly.

In addition, the third resistor 112 and the fourth resistor 124 in FIG. 2A may generate a source degeneration circuit to eliminate the former discontinuous on and off states of the soft-start device, such that an output of a reference voltage is smoother; that is, an open-loop control may be smoothly switched to a closed-loop control. As the second transistor is turned on, a steadily increased potential difference is generated between both ends of the second resistor 121, and the reference voltage that should be obtained by the soft start is generated after the first capacitor 122 achieves voltage stabilization. The reference voltage may finally reach a stable voltage value, which may be used as a bandgap voltage value.

In addition, FIG. 2A may further include a reset switch 123 connected in parallel to the second resistor 121, and adapted to reset the reference voltage, such that a starting value of the reference voltage restarts from the voltage value of the original relative zero voltage.

Figure 2B:
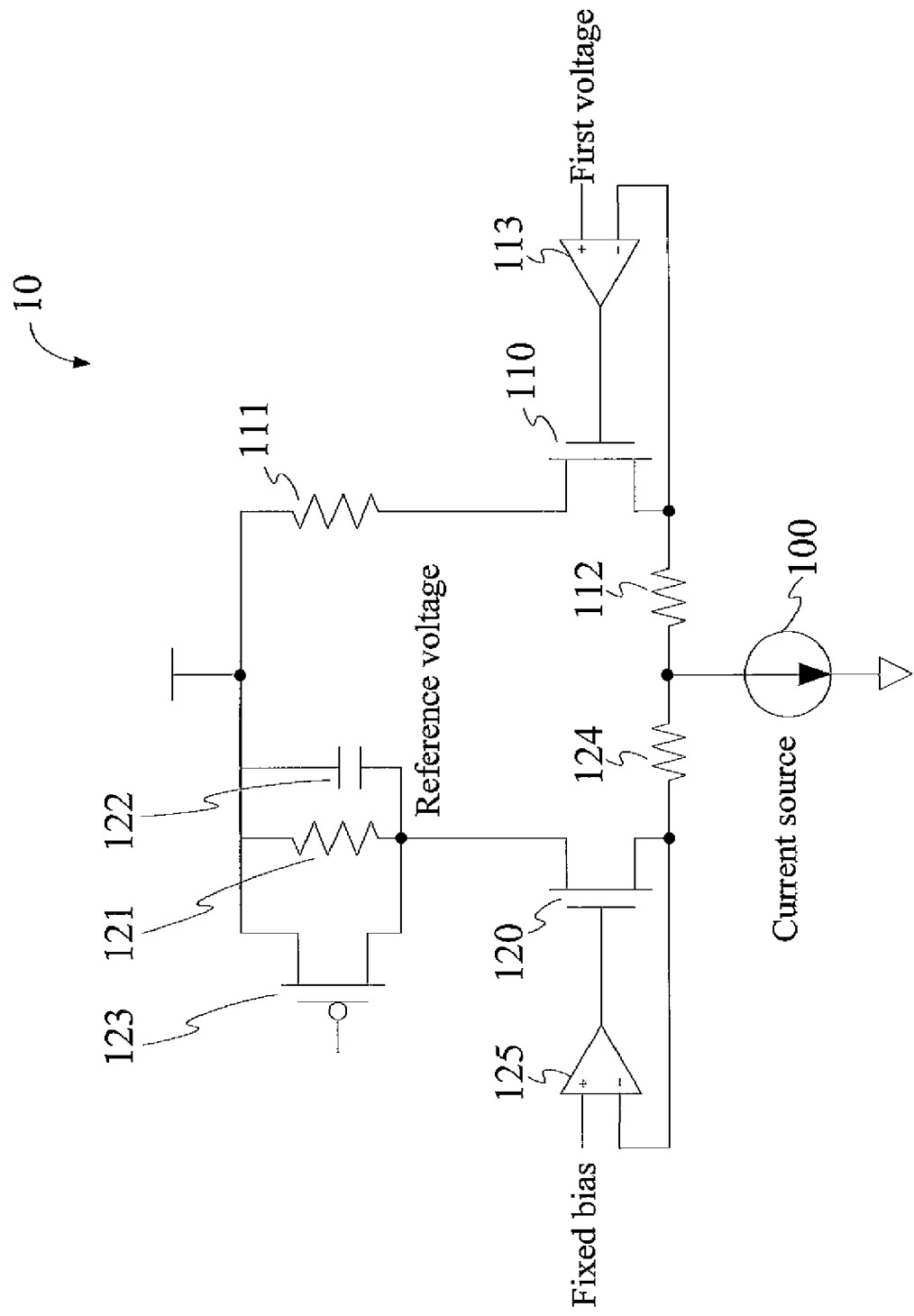
FIG. 2B is a schematic view of a soft-start device according to a second embodiment of the present invention.

In FIG. 2A, the first transistor 110 and the second transistor 120 are implemented by the PMOS switches, but a corresponding variation thereof using NMOS switches also falls within the scope of the present invention, and an embodiment thereof is shown in FIG. 2B.

Figure 3A:
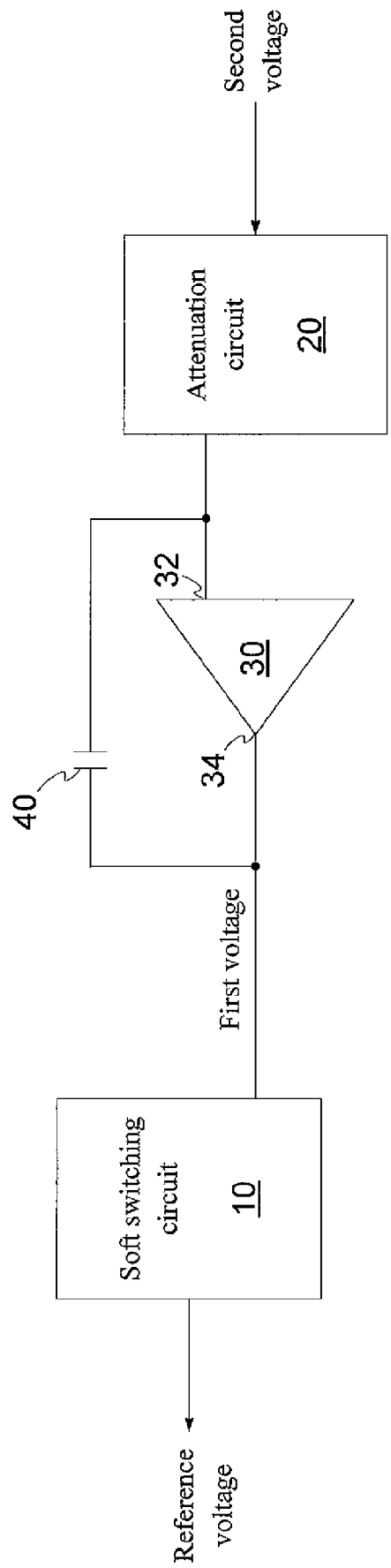
FIG. 3A is a schematic view of a soft-start device according to a third embodiment of the present invention.

FIG. 3A is a schematic view of a soft-start device according to a third embodiment of the present invention. In the third embodiment, in order to prolong the soft-start time such that a power supply voltage at an initial stage of power on may rise more gradually, the third embodiment further includes a second capacitor 40, an attenuation circuit 20, and an amplifier 30. The soft-start device according to the third embodiment is constituted by FIG. 3A in combination with the above embodiment in FIG. 2A or 2B, herein called a soft switching circuit 10. The soft switching circuit 10 is coupled to an output end 34 of the amplifier 30, so as to receive the first voltage and output the reference voltage according to the first voltage.

In FIG. 3A, the attenuation circuit 20 receives a second voltage. The working mechanism of the attenuation circuit 20 is enlarging a time constant by reducing a ratio of the second voltage, which will be described later in greater detail. The time constant here is an RC time constant.

The amplifier 30 has at least one input end 32 and at least one output end 34. The input end 32 is coupled to the attenuation circuit 20, and the second capacitor 40 is connected in series between the input end 32 and the output end 34. The second voltage charges the second capacitor 40 through the attenuation circuit 20, and the output end 34 outputs the gradually rising first voltage. Since the second voltage has enlarged the time constant after passing through the attenuation circuit 20, charging the second capacitor 40 by using the second voltage under the enlarged time constant can achieve a more gradual soft-start effect.

Figure 3B:
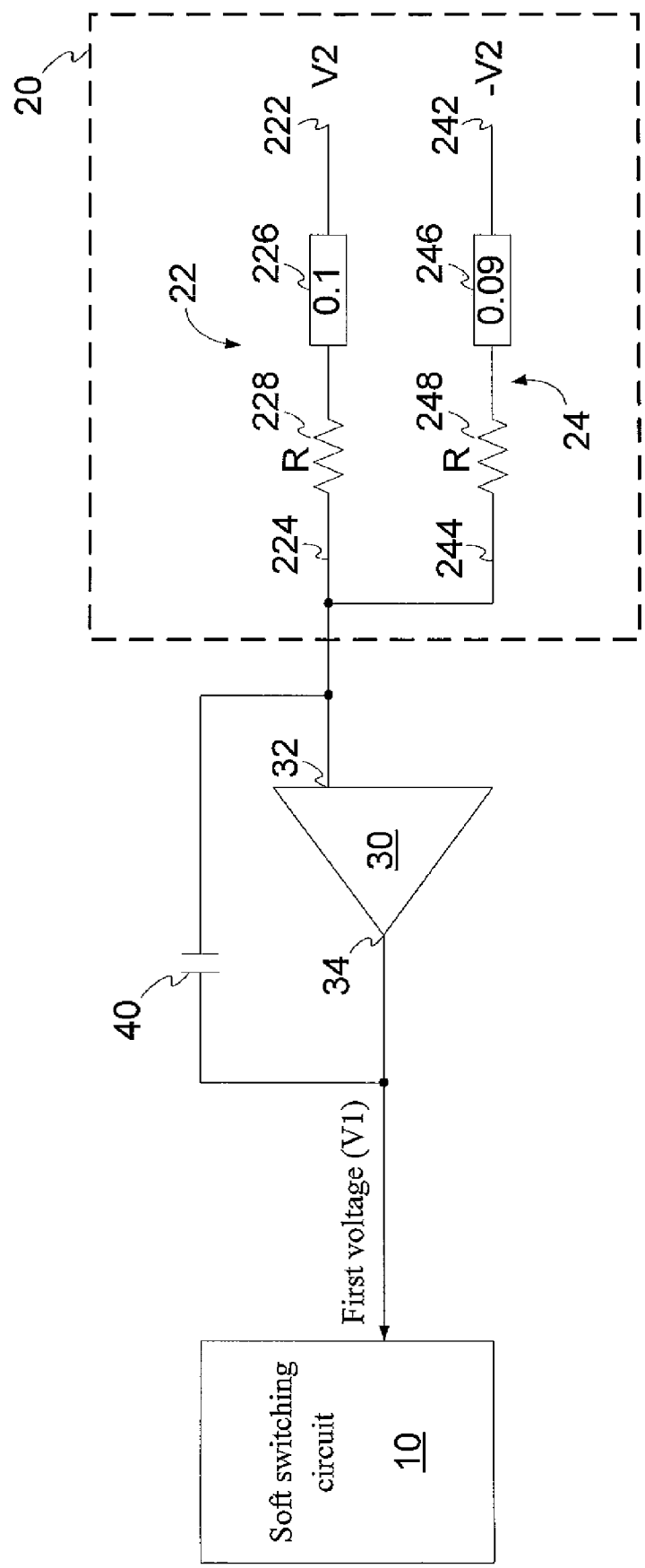
FIG. 3B is a schematic view of a soft-start device according to a fourth embodiment of the present invention.

FIG. 3B is a schematic view of a soft-start device according to a fourth embodiment of the present invention. In the fourth embodiment, an embodiment of a schematic view of a constitution of the attenuation circuit 20 is illustrated by an example, but the present invention is not limited thereto. In the fourth embodiment, the attenuation circuit 20 includes a first circuit 22 and a second circuit 24. The first circuit 22 includes a first end 222 and a second end 224. The first end 222 receives a positive value of the second voltage (V2) and is connected in series to a first attenuator 226 to generate a third voltage. The second circuit 24 includes a third end 242 and a fourth end 244. The third end 242 receives a negative value of the second voltage (V2) and is connected in series to a second attenuator 246 to generate a fourth voltage. The second end 224 of the first circuit 22 and the fourth end 244 of the second circuit 24 are coupled to the input end 32 of the amplifier 30 via a common point.

In addition, the first circuit 22 and the second circuit 24 may respectively include a first resistor 228 and a second resistor 248. The first resistor 228 is connected in series between the first attenuator 226 and the second end 224. The second resistor 248 is connected in series between the second attenuator 246 and the fourth end 244. A resistance value of the first resistor 228 is equal to that of the second resistor 248.

As shown in FIG. 3B, an attenuation ratio of the first attenuator 226 is 0.1, and thus the third voltage is 0.1 V2. An attenuation ratio of the second attenuator 246 is 0.09, and thus the fourth voltage is 0.09 V2. It should be noted that, the attenuation ratio is not limited thereto. As can be deduced from the example in FIG. 3, the first voltage (V1) output from the output end 34 of the amplifier 30 through the attenuation circuit 20 is expressed in the following equation:

$$V1 = \frac{0.1V2 - 0.09V2}{R} \Big/ SC = \frac{V2}{S(100RC)},$$

where RC is the time constant. Therefore, as can be known from the aforementioned equation, the time constant is increased by 100 times through the attenuation circuit 20.

In the example of FIG. 3B, the third voltage and the fourth voltage are generated according to the second voltage, and the time constant is enlarged according to a difference between the third voltage and the fourth voltage. In addition, the attenuation circuit 20 may be designed in a simpler manner, as shown in FIG. 3C.

Figure 3C:
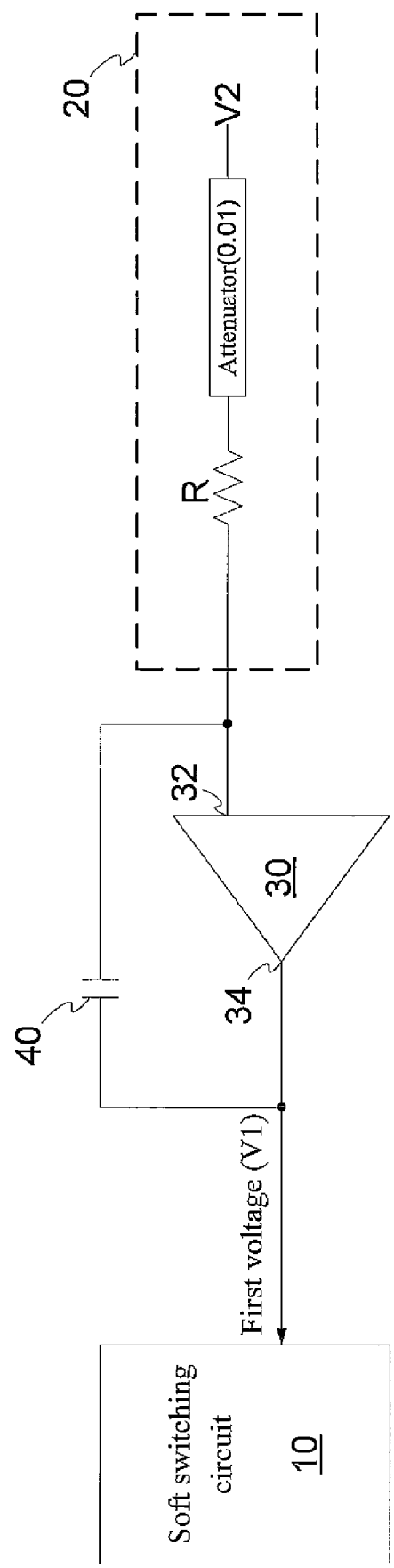
FIG. 3C is a schematic view of a soft-start device according to a fifth embodiment of the present invention.

In FIG. 3C, the attenuation circuit 20 does not need to be divided into two circuits, and one circuit is sufficient. One end of the circuit receives the second voltage, and then an attenuator connected in series directly attenuates the second voltage (V2) to be 0.0 V2. The first voltage (V1) obtained in this manner similarly has a time constant that is enlarged by 100 times.

As demonstrated by the above illustrations, the attenuation circuit 20 has multiple variations and shall not be limited to the examples listed above. The attenuation circuit 20 can enlarge the time constant as long as it can reduce the ratio of the second voltage, and thus the corresponding variations thereof all fall within the scope of the present invention. For example, the attenuation circuit 20 may also include at least one divider resistor adapted to generate the third voltage and the fourth voltage of different ratios from the second voltage, which may similarly enlarge the time constant according to a difference between the third voltage and the fourth voltage. Therefore, in the present invention the time constant may be enlarged easily by the attenuation circuit 20 provided in the present invention without additionally disposing a pin to be connected externally to a large capacitor in order to prolong the time constant as in the prior art, so as to obtain a more stable ramp voltage.

Figure 4:
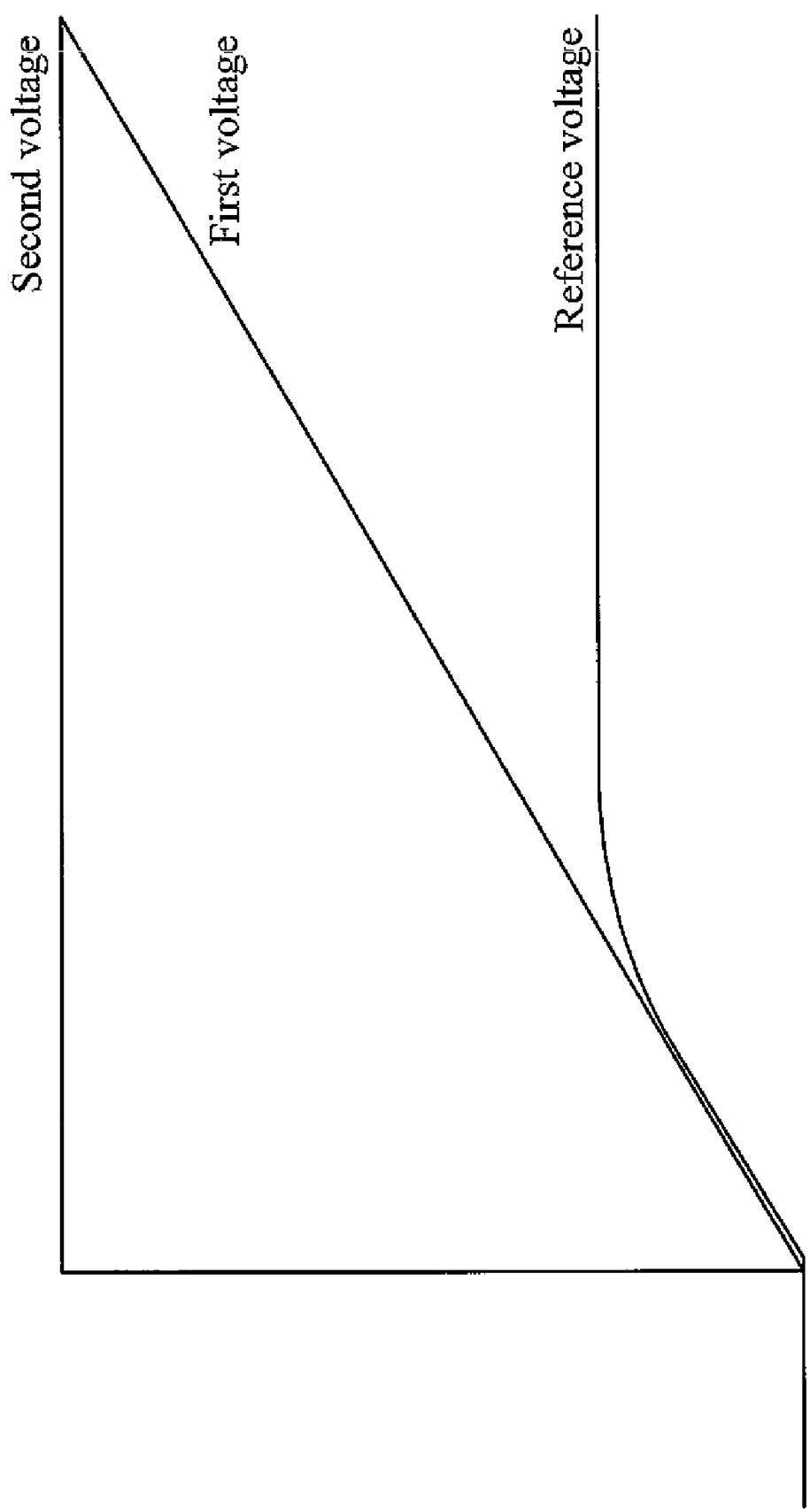
FIG. 4 is a schematic view of a voltage waveform of the present invention.

FIG. 4 is a schematic view of a voltage waveform of the present invention. The relationship between the second voltage, the first voltage, and the reference voltage may be comprehended more clearly from FIG. 4B. At the beginning, the second voltage input to the attenuation circuit 20 rises from a zero voltage value to a voltage value of the second voltage in a short time. The second voltage charges the second capacitor 40 through the attenuation circuit 20, and the output end 34 of the amplifier 30 outputs the gradually rising first voltage. As illustrated in FIG. 4, the voltage value of the first voltage may rise gradually from the zero voltage value to the voltage value of the second voltage. Finally, the first voltage generates the reference voltage through the soft switching circuit 10. In a waveform of the reference voltage at an initial stage (that is, when the first voltage is smaller than the fixed bias), the reference voltage rises along with the first voltage. When the first voltage is larger than the fixed bias, the reference voltage assumes a stable voltage value without continuing rising simultaneously with the first voltage.

With the soft-start device provided in the present invention, the soft-start mechanism and the normal mechanism may be switched smoothly between each other, such that the switching process is smooth, without any surge. Meanwhile, the time constant is enlarged without adding any capacitor, such that the switching process is more gradual, so as to solve the problem in the prior art that the switching time point is hard to control, which easily causes discontinuous surges making the system unstable and resulting in operation faults.

What is claimed is:

1. A soft-start device, comprising:
   a current source;
   a first transistor, coupled to the current source, wherein an amount of current conducted by the first transistor is determined according to a first voltage; and
   a second transistor, coupled to the current source, wherein an amount of current conducted by the second transistor is determined according to a fixed bias;
   wherein an initial voltage value of the first voltage is smaller than a voltage value of the fixed bias, and the voltage value of the first voltage is increased gradually to be larger than the voltage value of the fixed bias when a soft start begins,
   wherein the first voltage generates a reference voltage through the soft-start device, and
   at an initial stage, when the first voltage is less than the fixed bias, the reference voltage rises with the first voltage and at a subsequent stage, when the first voltage is larger than the fixed bias, the reference voltage assumes a stable voltage value without rising with the first voltage;
   a first resistor, coupled between a voltage source and the first transistor, wherein a potential difference between both ends of the first resistor is determined according to the amount of current conducted by the first transistor;
   a second resistor, coupled between the voltage source and the second transistor, wherein a potential difference between both ends of the second resistor is determined according to the amount of current conducted by the second transistor; and
   a first capacitor, coupled in parallel to the second resistor, and adapted to generate the reference voltage according to the potential difference between both ends of the second resistor;
   wherein when the voltage value of the first voltage is larger than the voltage value of the fixed bias, and the reference voltage has the stable voltage value.

2. The soft-start device according to claim 1, further comprising:
   a reset switch, coupled in parallel to the second resistor, and adapted to reset the reference voltage.

3. The soft-start device according to claim 1, further comprising:
   a third resistor, coupled between the current source and the first transistor to provide a source degeneration circuit; and
   a fourth resistor, coupled between the current source and the second transistor to provide the source degeneration circuit;
   wherein the source degeneration circuit smoothly switches an open-loop control to a closed-loop control.

4. The soft-start device according to claim 3, further comprising:
   a first comparator, having a positive input end for receiving the first voltage, a negative input end coupled to the third resistor and the first transistor, and an output end for controlling the first transistor; and a second comparator, having a positive input end for receiving the fixed bias, a negative input end coupled to the fourth resistor and the second transistor, and an output end for controlling the second transistor.

5. The soft-start device according to claim 1, wherein an amount of current of the current source is a sum of the amount of current conducted by the first transistor and the amount of current conducted by the second transistor.

6. A soft-start device comprising:
a current source;
a first transistor, coupled to the current source, wherein an amount of current conducted by the first transistor is determined according to a first voltage;
a second transistor, coupled to the current source, wherein an amount of current conducted by the second transistor is determined according to a fixed bias;
wherein an initial voltage value of the first voltage is smaller than a voltage value of the fixed bias, and the voltage value of the first voltage is increased gradually to be larger than the voltage value of the fixed bias when a soft start begins,
wherein the first voltage generates a reference voltage through the soft-start device, and
at an initial stage, when the first voltage is less than the fixed bias, the reference voltage rises with the first voltage and at a subsequent stage, when the first voltage is larger than the fixed bias, the reference voltage assumes a stable voltage value without rising with the first voltage;
an amplifier, comprising an input end and an output end;
a second capacitor, coupled between the input end and the output end of the amplifier; and
an attenuation circuit, adapted to receive a second voltage, attenuate a ratio of the second voltage to generate an attenuated second voltage, and output the attenuated second voltage to the input end of the amplifier;
wherein the attenuated second voltage charges the second capacitor, and the output end of the amplifier outputs the gradually rising first voltage.

7. The soft-start device according to claim 6, wherein the attenuation circuit generates a third voltage and a fourth voltage according to the second voltage, and enlarges a time constant according to a difference between the third voltage and the fourth voltage.

8. The soft-start device according to claim 7, wherein the attenuation circuit comprises:
a first circuit, comprising a first end, a second end, and a first attenuator, wherein the first end receives a positive value of the second voltage and is coupled in series to the first attenuator to generate the third voltage; and
a second circuit, comprising a third end, a fourth end, and a second attenuator, wherein the third end receives a negative value of the second voltage and is coupled in series to the second attenuator to generate the fourth voltage;
wherein the second end of the first circuit and the fourth end of the second circuit are both coupled to the input end of the amplifier.

9. The soft-start device according to claim 8, wherein the first circuit and the second circuit respectively further comprise:
a first resistor, coupled in series between the first attenuator and the second end; and
a second resistor, coupled in series between the second attenuator and the fourth end, wherein a resistance value of the second resistor is substantially equal to a resistance value of the first resistor.

10. The soft-start device according to claim 7, wherein the attenuation circuit comprises at least one divider resistor adapted to generate the third voltage and the fourth voltage.

11. The soft-start device according to claim 6, wherein the voltage value of the first voltage rises from a relative zero voltage value to a voltage value of the second voltage.

12. A soft-start device, comprising:
an amplifier, having an input end and an output end;
a second capacitor, coupled between the input end and the output end;
an attenuation circuit, for receiving a second voltage, and attenuating the second voltage to generate an attenuated second voltage, and outputting the attenuated second voltage to the input end; and
a soft switching circuit, coupled to the output end, and for receiving a first voltage and outputting a reference voltage according to the first voltage;
wherein the attenuated second voltage charges the second capacitor, and the output end outputs the first voltage as a gradually rising first voltage,
wherein at an initial first stage of the soft-start device, the reference voltage rises with the first voltage and at a second stage of the soft-start device, the reference voltage assumes a stable voltage value without rising with the first voltage.

13. The soft-start device according to claim 12, wherein the soft switching circuit comprises: a current source;
a first transistor, coupled to the current source, wherein an amount of current conducted by the first transistor is determined according to the first voltage; and
a second transistor, coupled to the current source, wherein an amount of current conducted by the second transistor is determined according to a fixed bias;
wherein an initial voltage value of the first voltage is smaller than a voltage value of the fixed bias, and the voltage value of the first voltage is increased gradually to be larger than the voltage value of the fixed bias when a soft start works.

14. The soft-start device according to claim 13, wherein the soft switching circuit further comprises:
a first resistor, coupled between a voltage source and the first transistor, wherein a potential difference between both ends of the first resistor is determined according to the amount of current conducted by the first transistor;
a second resistor, coupled between the voltage source and the second transistor, wherein a potential difference between both ends of the second resistor is determined according to the amount of current conducted by the second transistor; and
a first capacitor, coupled in parallel to the second resistor, and adapted to generate the reference voltage according to the potential difference between both ends of the second resistor;
wherein when the voltage value of the first voltage is larger than the voltage value of the fixed bias, the reference voltage has a stable voltage value.

15. The soft-start device according to claim 14, wherein the stable voltage value is a bandgap voltage value.

16. The soft-start device according to claim 14, wherein the soft switching circuit further comprises:
a reset switch, coupled in parallel to the second resistor, and adapted to reset the reference voltage.

17. The soft-start device according to claim 14, wherein the soft switching circuit further comprises:
a third resistor, coupled between the current source and the first transistor to generate a source degeneration circuit; and a fourth resistor, coupled between the current source and the second transistor to generate the source degeneration circuit;

wherein the source degeneration circuit smoothly switches an open-loop control to a closed-loop control.

18. The soft-start device according to claim 17, wherein the soft switching circuit further comprises:

a first comparator, having a positive input end for receiving the first voltage, a negative input end coupled to the third resistor and the first transistor, and an output end for controlling the first transistor; and a second comparator, having a positive input end for receiving the fixed bias, a negative input end coupled to the fourth resistor and the second transistor, and an output end for controlling the second transistor.

* * * * *